United States Patent [19]

Gans et al.

[11] 4,402,516

[45] Sep. 6, 1983

[54] FULLY CONSUMABLE REMOTELY OPERATED SEAL

[75] Inventors: Werner A. Gans, Sunnyvale; Frank G. Borgardt, Cupertino; George A. Lo, San Jose, all of Calif.

[73] Assignee: The United States of America as represented by the Secretary of the Navy, Washington, D.C.

[21] Appl. No.: 454,937

[22] Filed: Jan. 3, 1983

[51] Int. Cl.³ ............................................. F16J 15/02
[52] U.S. Cl. ........................................ 277/26; 277/1;
277/DIG. 10; 277/237 R
[58] Field of Search ......... 277/1, 9, 9.5, 26, DIG. 10, 277/237

[56] References Cited

U.S. PATENT DOCUMENTS

| 1,815,418 | 7/1931 | O'Bryan | 277/9 |
| 3,088,478 | 5/1963 | Schimmel | 137/68 |
| 3,109,553 | 11/1963 | Fike et al. | 220/47 |
| 3,472,254 | 10/1969 | Reed et al. | 277/26 X |
| 3,638,573 | 2/1972 | Campbell | 102/90 |
| 3,777,772 | 12/1973 | Arnold et al. | 137/68 |
| 3,860,678 | 1/1975 | Martin et al. | 264/3 A |
| 3,861,690 | 1/1975 | Englesson et al. | 277/26 |
| 3,869,132 | 3/1975 | Taylor et al. | 277/26 |

OTHER PUBLICATIONS

Plant Operation And Maintenance Section, Mar. 1954, p. 123.

*Primary Examiner*—Robert S. Ward, Jr.
*Attorney, Agent, or Firm*—R. F. Beers; Charles D. B. Curry; George L. Craig

[57] ABSTRACT

A method for sealing ports, ducts and the like using a fully consumable material as the sealing medium and utilizing the consumable capability to provide remote removal of the seal without damage to the sealed areas and with no remaining obstruction in the port, duct or the like. The fully consumable seal may be configured to the geometry of the aperture to be sealed and has thickness determined by pressure difference across the seal and time required to remove the seal.

4 Claims, 1 Drawing Figure

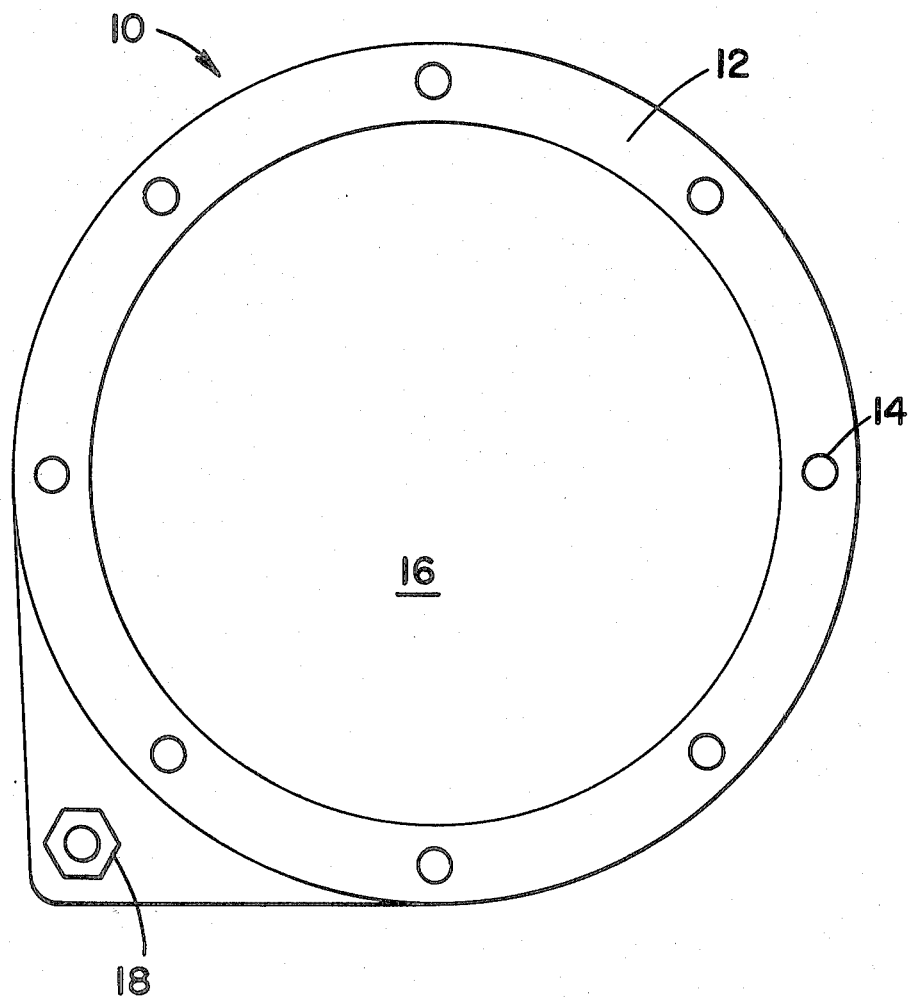

FULLY CONSUMABLE REMOTELY OPERATED SEAL

BACKGROUND OF THE INVENTION

1. Field of the Invention

The invention relates to a method of sealing apertures between two environments such that the seal may be removed remotely and completely. More specifically, the invention relates to a method of sealing apertures between two environments with a fully consumable material which may be ignited remotely leaving clear passage between the environments without damage to either environment.

2. Description of Prior Art

Frequently it is desirable to protectively seal an aperture or open duct or the like between two environments and at a later time remotely remove the seal without degrading the region protectively sealed. Such seals find extensive use in aerospace applications for sealing out weather, corrosive chemicals, vacuums and the like. Where such a seal is used as a protective interface between two regions, it must be lightweight, reliable and capable of resisting potentially high pressure and temperature differentials across the interface. Currently, there are three techniques primarily practiced by prior art.

One technique is to use motor-driven or solenoid-operated valves or metal shades to seal the aperture. However, the valve and associated motor are typically heavy (generally an order of magnitude heavier than the present invention) and bulky as well as susceptible to malfunction in low-temperature applications. Another technique is to use frangible diaphragms in which the sealing diaphragm is either punctured or caused to explode. The former technique typically results in the aperture still being partially occluded and flow across the interface somewhat inhibited. The latter technique typically uses an explosive charge laminated between two or more frangible layers and when the charge is ignited the seal is blown away. However, personnel, sensitive equipment and surfaces either side of the seal may be damaged by the explosive shock wave or by seal fragments having velocity as high as 2000 ft/sec. A last technique within prior art is the fabrication of thin open-cell laminates in which encapsulated incendiary materials are sealed inside some of the cells and later ignited. This technique however requires complex encapsulation procedures, complex fabrication structure of the laminate and an oxygen environment to support combustion. Further this technique is directed to destruction/disfiguring of equipment adjacent the laminate rather than acting as a structural seal between different regions and would leave a partial occlusion that would restrict the flow. The present invention avoids the limitations of the prior art and provides a method for structurally sealing specific regions and removing the seal remotely and completely at a later time without requiring oxygen and without danger of degradation to nearby personnel or equipment.

SUMMARY OF THE INVENTION

Described is a method for sealing ports, ducts and the like using a fully consumable material as the sealing medium and utilizing the consumable capability to provide remote removal of the seal without damage to the sealed areas and with no remaining obstruction in the port, duct or the like. The fully consumable seal may be configured to the geometry of the aperture to be sealed and has thickness determined by the pressure difference across the seal and the time required to remove the seal. The seal may also be removed in an environment lacking oxygen.

A primary object of invention is a technique for sealing apertures with a fully consumable material such that the seal may be completely removed remotely at a later time without damage to the sealed areas.

BRIEF DESCRIPTION OF THE DRAWING

The single drawing illustrates one embodiment of the present invention showing the seal for a circular aperture.

DESCRIPTION OF THE PREFERRED EMBODIMENT

Referring to the drawing, the present invention is shown in one embodiment. The seal 10 for a circular aperture consists of a mounting frame 12 for hermetic attachment to the aperture; a plurality of attachment points 14 (e.g., holes) along the frame and the selected consumable material 16 held within the mounting frame. An igniter 18 is attached on the frame such that it extends through the frame and contacts the consumable seal material.

Although the embodiment shown is for sealing a circular aperture, the frame and seal material may be configured to any aperture geometry. The consumable material can be chosen from a number of materials depending on the operating environment (e.g., pressure differential across the seal, temperature differential across the seal, type of region sealed off, etc.) and the time required to remove the seal (i.e., burn time).

Materials which may be used to fabricate fully consumable seals according to the present invention include intermetallic composites, propellants and incendiary plastics. Examples of intermetallic composites are palladium-aluminum, platinum-aluminum, titanium-boron and zirconium-boron. Example propellants are nitrocellulose-ammonium perchlorate and polybutadiene-ammonium perchlorate-diisocyanate. A representative incendiary plastic is polyurethane with RDX. A seal using a palladium-aluminum intermetallic has been successfully demonstrated interfacing environments in which at least one environment was water or ice. Successful tests have also been made for structural thicknesses between 3 mils and 1 inch; for pressure differentials between environments up to 3 atmospheres; and for temperatures between −65° F. and 200° F.

While the present invention has been described in its broadest aspects, that is, a structural seal of a fully consumable material, it is to be understood the words are of description and not limitation and may be practiced other than described while still in the scope of invention.

What is claimed is:

1. A technique for sealing apertures of varying geometric configurations such that the seal may be removed remotely and completely in a non-explosive manner and without requiring oxygen comprising the steps of:
    (a) fabricating a mounting frame configured to hermetically fit within said aperture, said mounting frame having substantially the same open area as said aperture;

(b) forming a piece of fully consumable material such that said material fits within said mounting frame;
(c) locating said mounting frame holding said fully consumable material within said aperture; and
(d) attaching an ignitor to said frame such that said ignitor is in direct communication with said consumable material and may be activated remotely.

2. A seal as recited in claim 1 wherein said consumable material is a propellant chosen from the class of nitrocelluloseammonium perchlorate or polybutadiene-ammonium perchlorate-diisocyanate.

3. A seal as recited in claim 1 wherein said consumable material is an intermetallic composite chosen from the class of palladium-aluminum, platinum-aluminum, titanium-boron or zirconium-boron.

4. A seal as recited in claim 1 wherein said consumable material is polyurethane with RDX.

* * * * *